UNITED STATES PATENT OFFICE.

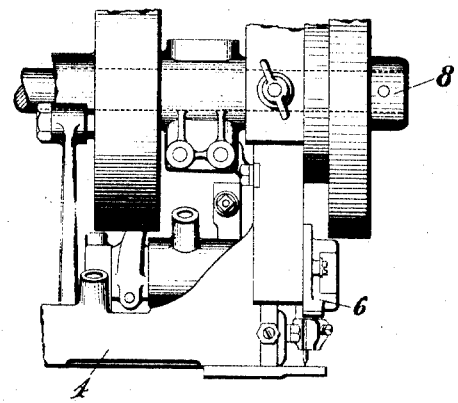
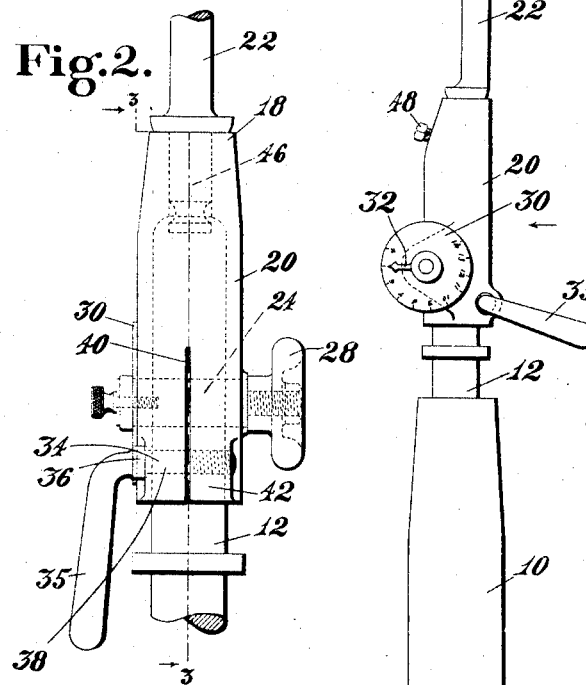
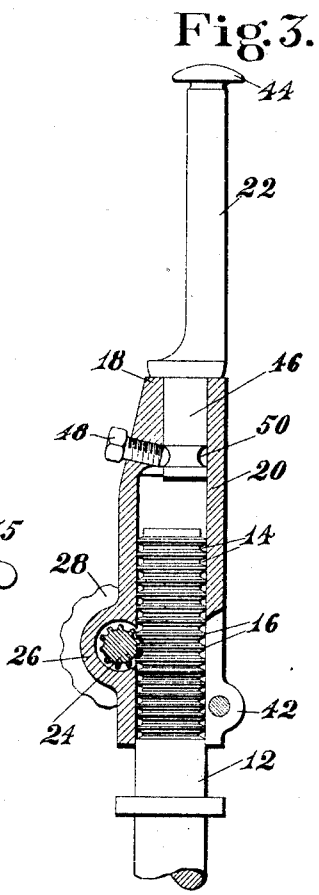

THOMAS SCOTT AND JAMES E. CLELAND, OF MONTREAL, QUEBEC, CANADA, ASSIGNORS TO UNITED SHOE MACHINERY CORPORATION, OF PATERSON, NEW JERSEY, A CORPORATION OF NEW JERSEY.

WORK-SUPPORTING MECHANISM.

1,365,792.  Specification of Letters Patent.  Patented Jan. 18, 1921.

Application filed March 11, 1918. Serial No. 221,719.

*To all whom it may concern:*

Be it known that we, THOMAS SCOTT and JAMES E. CLELAND, subjects of the King of England, residing at Montreal, in the Province of Quebec and Dominion of Canada, have invented certain Improvements in Work-Supporting Mechanisms, of which the following description in connection with the accompanying drawings, is a specification, like reference characters on the drawings indicating like parts in the several figures.

This invention relates to work supporting mechanisms for fastening inserting machines and more particularly concerns the means for adjusting the work supporting means relatively to the fastening inserting mechanism of such a machine.

In the operation of fastening inserting machines, it is most essential that the work be presented in exact relation to the fastening inserting mechanism both as regards the maintenance of the work against the foot plate of the fastening inserting machine to steady the work, and to insure the driving of the fastenings completely into the work and as regards the arrangement of the work laterally of the plane of operation of the fastening inserting mechanism to cause the fastenings to be positioned properly in the work. In order to maintain work of different thicknesses in proper position for operation of the fastening inserting mechanism thereon, the work supporting means must be adjusted vertically. On the other hand, to the end that work of varying forms may be so arranged relatively to the point of insertion of the fastenings that the fastenings will be rightly placed in the work and that the work may be sustained firmly under the impact of the fastening inserting mechanism, adjustment of the work supporting means laterally of the plane of operation of the fastening inserting mechanism must be made. Since the character of the work upon which fastening inserting machines are called upon to operate differs very greatly as to thickness and form, it is imperative that the means for supporting the work have a wide range and great delicacy of adjustment so that by adjustment of the work supporting means variations in thickness and form of the work may be compensated for and the work presented to the fastening inserting mechanism in the exact position which it should occupy relatively to said mechanism. Moreover, since the fastening inserting mechanism imparts a heavy blow upon the work in the insertion of the fastenings, it is essential that the work supporting means be of a nature to sustain the blow of the fastening inserting mechanism without distortion or other injury to the work supporting means or disturbance of its adjustments. The general object of this invention is therefore to provide work supporting means that can be adjusted for the presentation of the work in exact relation to the fastening inserting mechanism and will sustain the work rigidly under the blow imparted by the fastening inserting mechanism. In accordance with a further object of the invention, the structure wherein the invention is embodied is made simple in construction and convenient and sensitive in operation.

An important feature of the invention resides in the provision of means for adjusting the horn longitudinally of the horn post comprising coöperating parts carried by the horn and the horn post and constructed and arranged to permit rotary movement of the horn on the horn post and to maintain the horn in a fixed position of adjustment longitudinally of the horn post regardless of rotary movement of the horn. The horn is provided with a work supporting surface adjustable laterally of the axis of the horn post by rotary movement of the horn on the horn post so that the work supporting surface can readily be adjusted either axially or eccentrically of the horn post.

The invention further contemplates the provision of means for securing the horn in adjusted position on the horn post of a character such as to be operated preceding or subsequent to the adjusting of the horn on the horn post with the utmost ease and quickness to release the horn for movement or to lock it in adjusted position, a member manipulable by the operator to adjust the horn longitudinally of the horn post without rotating it or to move the horn simultaneously both longitudinally and rotatively relatively to the horn post, and means for indicating to the operator the relative arrangement of the horn longitudinally of the horn post.

Still other objects and features of the invention will be apparent as the description proceeds.

In the drawings,—

Figure 1 illustrates a portion of a fastening inserting machine equipped with work supporting mechanism made in accordance with the invention, Fig. 2 is a view in elevation of the work supporting mechanism looking in the direction of the arrow on Fig. 1, and Fig. 3 is a view in elevation of the work supporting mechanism partly in cross section along the line 3—3 of Fig. 2 looking in the direction of the arrows.

The invention is disclosed by way of example as associated with a fastening inserting machine of the type described in the United States Letters Patent to Casgrain No. 1,017,381, granted February 13, 1912, said machine comprising a frame 2 carrying a head 4 upon which is mounted fastening inserting mechanism 6 operated from the main shaft 8. The frame 2 is further provided with an upstanding hollow projection 10 in which is slidably mounted the horn post 12 which carries the work supporting mechanism by which the work is held in operative relation with the fastening inserting mechanism 6 during the insertion of the fastenings into the work. The above-mentioned elements constitute in themselves no part of the present invention, for which reason a further description thereof is deemed unnecessary.

In the present instance of the invention the horn post 12 is formed adjacent to its upper end with annular grooves 14 alternating with annular corrugations or teeth 16, and a horn 18 comprising a sleeved portion or member 20 and a horn spindle 22 is mounted on the upper end of the horn post, the sleeve 20 of the horn being fitted loosely on the toothed upper end of the horn post in such manner as to be freely movable both longitudinally and rotatively relatively to the horn post.

Means are preferably provided for adjusting the horn 18 vertically on the horn post and, in the illustrated embodiment of the invention, such means comprises a pinion stud 24 journaled in a boss 26 formed on the sleeve 20, the teeth of the pinion being constructed and arranged for engagement with the corrugations or teeth 16 of the horn post. The pinion stud 24 has provided thereon at one end the hand wheel 28 for manipulation by the operator in effecting the adjustment of the horn.

It is, moreover, desirable that the operator should be able to determine readily the exact position of adjustment of the horn 18 on the horn post 12. In the present instance of the invention the operator is enabled so to do by means of an indicator disk or scale 30 carried by the sleeve 20 of the horn and a finger 32 carried by the end of the pinion stud 24 opposite the hand wheel 28 and arranged for movement over the face of the indicator disk 30.

In order that the sleeve 20 of the horn, which, as before stated, is constructed to slide freely on the horn post, may be maintained in any position to which it may be adjusted, means are provided for securing it against movement relatively to the horn post. As illustrated, the sleeve is secured in position on the horn post by means of a handled set screw 34 having formed thereon an annular enlargement or shoulder 36, said screw 34 being adapted to pass loosely through an ear 38 formed on the sleeve 20 at one side of a slit 40 and to be threaded into an internally threaded opening formed in the ear 42 at the other side of the slit 40. Referring to Fig. 2, it will be evident that when the screw 34 is threaded into the opening in the ear 42, the shoulder 36 of the screw 34 will engage the ear 38 of the sleeve 20 and the ears 38 and 42 will be drawn together in such manner as to lock the sleeve 20 rigidly on the horn post 12. The handle 35 of the set screw 34 (Fig. 2) is arranged on the horn post oppositely of the hand wheel 28. Consequently the operator may conveniently grasp the handle 35 and the milled nut 28 with his hands at the same time and is thus enabled, with the greatest possible ease, accuracy, and despatch, to adjust the horn to any desired position, as determined by inspection of the indicator which is so located as to be readily inspected by the operator while manipulating the handle 35 and nut 28, and to secure the horn in adjusted position on the horn post.

Means are also provided for adjusting the horn spindle 22 and the horn tip 44 carried thereby relatively to the axis of the horn post 12. As shown, said means comprises a stud 46 socketed in the upper end of the sleeve 20 eccentrically of the axis of the sleeve and of the horn post. It will be obvious from the foregoing that the spindle 22 and tip 44 of the horn may be adjusted relatively to the axis of the horn post by angular or rotative movement of the sleeve 20 about the horn post. It will be further noted that, by reason of the annular corrugations in the horn post, the sleeve 20 of the horn may be rotatively moved on the horn post without affecting the position of longitudinal adjustment of the horn on the horn post, since, when the sleeve 20 is moved angularly on the horn post, the teeth of the pinion stud 24 travel in the grooves 14 of the horn post. It will further be apparent that by the construction hereinbefore described the horn 18 may be adjusted both longitudinally and rotatively relatively to the upper end of the horn post and may be locked in adjusted position by the handled set screw 34. Moreover, the arrangement of the parts is such that the operator, by manipulation of the hand wheel 28 in the direction of the length of the pinion stud 24 at the same time that he turns the wheel, may simultaneously effect both rotary and longitudinal adjustments of the horn on the horn post.

If the horn tip 44 were mounted eccentrically of the axis of the sleeve 20 and horn post 12 without capacity for adjustment relatively to the axis of the horn post, it would follow that the adjustment of the horn tip 44 would be limited to a circular path about the axis of the horn post. In order, therefore, to permit universal adjustment of the horn tip 44 on the horn post, the stud 46 by which the horn spindle 22 is connected to the sleeve 20 is arranged eccentrically of the horn spindle 22 and horn tip 44 to a degree substantially equal to the eccentricity of the stud relatively to the axis of the horn post 12. It follows, therefore, that by angular movement of the horn spindle 22 and the stud 46, the axis of the horn spindle and of the horn tip 44 may be alined with the axis of the horn post. Obviously when the horn spindle and horn tip are so related to the axis of the horn post, angular movement of the sleeve 20 about the horn post will not change the relation of the horn spindle 22 and horn tip 44 to the horn post. If, however, the horn spindle 22 and stud 46 are turned to a position such that the axis of the horn spindle is slightly offset from the axis of the horn post, angular or rotative movemnt of the sleeve 20 about the horn post will effect adjustment of the horn tip relatively to the axis of the horn post, and it will be further apparent that, by adjustment of the horn spindle 22 and stud 46 relatively to the sleeve 20 and of the sleeve 20 angularly of the horn post, the horn tip 44 and horn spindle 22 may be moved to any position within a range of movement defined by a circle having the axis of the horn post as a center and a radius equal to the sum of the distances by which the axis of the stud 46 is offset from the axis of the horn post and by which the horn spindle 22 and horn tip 44 are offset from the axis of the stud 46. As shown, the horn spindle 22 is secured rotatably to the sleeve 20 by a screw or the like 48 engaging in an annular groove 50 formed in the periphery of the stud 46 adjacent to its lower end.

Having fully described our invention, what we claim as new and desire to secure by Letters Patent of the United States is:

1. Work supporting mechanism of the class described, comprising a horn post having annular teeth formed thereon, a horn having a sleeved member slidably and rotatably mounted on the toothed portion of the horn post and being formed to present a work supporting surface disposed eccentrically of the axis of said sleeved member, and a pinion journaled in said member and constructed and arranged for engagement with the teeth on the horn post.

2. Work supporting mechanism of the class described, comprising a horn post, a horn slidably and rotatably mounted on the horn post and formed to present a work supporting surface disposed eccentrically of the axis of the horn post, means for adjusting the horn longitudinally of the horn post comprising annular teeth on one of said parts and a pinion carried by the other of said parts, and means for securing the horn in adjusted position on the horn post.

3. Work supporting mechanism of the class described, comprising a horn post, a horn having a sleeved member slidably and rotatably mounted on the horn post and being formed to present a work supporting surface disposed eccentrically of the axis of the horn post, said member being split so as normally to fit loosely on the horn post, connections between the horn post and said member comprising annular teeth on one of said parts and a pinion carried by the other of said parts constructed and arranged to maintain operative engagement with the teeth upon movement of said member rotatably about the horn post to adjust said work supporting surface, and means for drawing together the split sections of the horn to secure it in adjusted position on the upper end of the horn post.

4. Work supporting mechanism of the class described, comprising a horn post having annular teeth formed thereon, a horn having a sleeved member fitted slidably and rotatably on the toothed portion of the horn post and formed to present a work supporting surface adjustable laterally of the axis of the horn post by rotation of the horn, a shaft journaled in said member, a pinion carried by said shaft and constructed and arranged for engagement with the teeth of the horn post, a member on one end of the shaft formed for manipulation by the operator to turn said shaft thereby to adjust said sleeved member longitudinally of the horn post, means for indicating the position of adjustment of the horn on the horn post comprising a member mounted on the other end of said shaft, and means independent of said shaft for securing said sleeved member in adjusted position on the horn post.

5. Work supporting mechanism of the class described, comprising a horn post, a horn mounted on the horn post for longitudinal and rotary movement relatively thereto and having a work supporting surface adjustable laterally of the axis of the horn post by rotary movement of the horn on the horn post, and means for adjusting the horn longitudinally of the horn post comprising coöperating parts carried by the horn and the horn post and constructed and arranged to permit rotary movement of the horn on the horn post and to maintain the horn in a fixed position of adjustment longitudinally of the horn post regardless of rotary movement of the horn about the horn post.

6. Work supporting mechanism of the class described, comprising a horn post, a horn having a sleeved member mounted on the horn post for longitudinal and rotary movement relatively thereto and having a horn spindle carried eccentrically by said member, and means for adjusting the horn longitudinally of the horn post comprising coöperating parts carried by the horn and the horn post and constructed and arranged to permit rotary movement of the horn on the horn post and to maintain the horn in a fixed position of adjustment longitudinally of the horn post regardless of rotary movement of the horn relatively to the horn post.

7. Work supporting mechanism of the class described, comprising a horn post, a horn having a sleeved member mounted on the horn post for longitudinal and rotary movement relatively thereto and having a work supporting surface adjustable laterally of the axis of the horn post by rotary movement of said member about the horn post, and means for adjusting said member relatively to the horn post comprising annular teeth carried by one of said parts and a pinion carried by the other of said parts and arranged for engagement with said teeth so as to allow rotary movement of the horn on the horn post and to effect movement of the horn longitudinally of the horn post upon rotation of said pinion regardless of the relative angular arrangement of the horn and horn post.

8. Work supporting mechanism of the class described, comprising a horn post, a horn mounted on the horn post for longitudinal and rotary movement relatively thereto and having a work supporting surface adjustable laterally of the axis of the horn post by rotary movement of the horn on the horn post, and connections between the horn and the horn post comprising a member manipulable by the operator to move the sleeved member longitudinally of the horn post without rotary movement of the sleeved member or to move said sleeved member simultaneously both longitudinally and rotatively relatively to the horn post.

9. Work supporting mechanism of the class described, comprising a horn post, a horn slidably and rotatably mounted thereon and formed to present a work supporting surface adjustable laterally of the axis of the horn post by rotation of the horn, means for adjusting the horn on the horn post comprising annular teeth on one of said parts and a pinion carried by the other of said parts, a controlling member for the pinion arranged at one side of the horn post and constructed for manipulation by the operator, means on the opposite side of the horn post from said member for indicating the position of adjustment of the horn on the horn post, and means for securing the horn in adjusted position on the horn post comprising a member constructed for manipulation by the operator and arranged on the same side of the horn post as said indicating means so that the operator can conveniently engage both members at the same time when in a position to view said indicating means and is thus enabled to operate said securing means immediately upon the attainment of the proper position of adjustment of the horn on the horn post as evidenced by said indicating means.

10. Work supporting mechanism of the class described, comprising a horn post, a horn mounted on the horn post for rotation relatively thereto and formed to present a work supporting surface adjustable laterally of the horn post by rotation of the horn, and connections between the horn and the horn post comprising a pinion carried by one of said parts and annular teeth on the other of said parts.

11. Work supporting mechanism comprising a horn post, a horn carried by the horn post and formed to present a work supporting surface disposed eccentrically of the axis of the horn post, connections between the horn and the horn post constructed and arranged to permit rotation of the horn on the post to effect lateral adjustment of said work supporting surface relatively to the axis of the post without affecting the adjustment of the horn longitudinally of the post, and means for rotating the horn.

12. Work supporting mechanism comprising a horn post, a horn carried by the horn post and having a work supporting surface adjustable laterally of the axis of the horn post by rotary movement of said horn, and connections between the horn and the horn post comprising a member formed for manipulation by the operator and adapted to have movements of two characters imparted to it by the operator to rotate the horn and move it longitudinally of the post.

13. Work supporting mechanism comprising a horn post, a horn carried by the horn post and having a work supporting surface adjustable laterally of the axis of the horn post by rotary movement of the horn, and connections between the horn and the horn post comprising a member formed for manipulation by the operator and adapted for rotation to move the horn longitudinally of the horn post and for movement of a different character to rotate the horn on the horn post.

In testimony whereof we have signed our names to this specification.

THOMAS SCOTT.
JAMES E. CLELAND.